(12) United States Patent  (10) Patent No.: US 9,134,467 B2
Krasnov et al.  (45) Date of Patent: Sep. 15, 2015

(54) MIRROR

(71) Applicant: Guardian Industries Corp., Auburn Hills, MI (US)

(72) Inventors: Alexey Krasnov, Canton, MI (US); Willem den Boer, Brighton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 303 days.

(21) Appl. No.: 13/749,760

(22) Filed: Jan. 25, 2013

(65) Prior Publication Data

US 2014/0211332 A1 Jul. 31, 2014

(51) Int. Cl.
*G02B 5/08* (2006.01)
*C03C 17/36* (2006.01)

(52) U.S. Cl.
CPC .............. *G02B 5/0875* (2013.01); *C03C 17/36* (2013.01); *C03C 17/361* (2013.01)

(58) Field of Classification Search
CPC .. G02B 5/0858; G02B 5/0808; G02B 5/0833; G02B 5/0825; G02B 5/085; G02B 5/08; B60R 1/08
USPC .......................... 359/849, 838, 839, 871, 604
See application file for complete search history.

(56) References Cited

U.S. PATENT DOCUMENTS

| | | |
|---|---|---|
| 4,780,372 A | 10/1988 | Tracy et al. |
| 6,686,050 B2 * | 2/2004 | Lingle et al. ................. 428/428 |
| 6,783,253 B2 | 8/2004 | Thomsen et al. |
| 6,934,085 B2 | 8/2005 | Stachowiak et al. |
| 7,276,289 B2 | 10/2007 | Lu et al. |
| 8,173,263 B2 | 5/2012 | Lingle et al. |
| 8,187,713 B2 | 5/2012 | Lemmer et al. |
| 2006/0077580 A1 | 4/2006 | Wuillaume et al. |
| 2007/0178316 A1 | 8/2007 | Mellott |
| 2008/0073203 A1 | 3/2008 | Wang et al. |
| 2008/0164173 A1 | 7/2008 | Savakus |
| 2008/0212189 A1* | 9/2008 | Baur et al. .................... 359/604 |
| 2010/0229853 A1 | 9/2010 | Vandal et al. |
| 2011/0176212 A1 | 7/2011 | Lu et al. |
| 2011/0176236 A1 | 7/2011 | Lu et al. |
| 2012/0307386 A1 | 12/2012 | Sakurai |

FOREIGN PATENT DOCUMENTS

EP 0 301 755 2/1989
WO WO 98/39262 9/1998

* cited by examiner

*Primary Examiner* — Euncha Cherry
(74) *Attorney, Agent, or Firm* — Nixon & Vanderhye P.C.

(57) ABSTRACT

Mirrors having at least one of: (a) a reflective film including a first layer of or including aluminum and a second layer of or including silver or the like, and/or (b) a color tuning layer between first and second layers. The mirrors may be second surface mirrors in certain example embodiments. The mirrors may be flat or bent in different instances, and may or may not be heat treated (e.g., thermally tempered and/or thermally bent).

27 Claims, 5 Drawing Sheets

MIRROR

FIELD OF THE INVENTION

Certain example embodiments of this invention relate to mirrors and/or methods of making the same. More particularly, certain example embodiments relate to mirrors having at least one of: (a) a reflective film including a first layer of or including aluminum and a second layer of or including silver or the like, and/or (b) a color tuning layer between first and second layers. The mirrors may be second surface mirrors in certain example embodiments. The mirrors may be flat or bent in different instances, and may or may not be heat treated (e.g., thermally tempered and/or thermally bent). In certain example instances, such mirrors may be used in interior residential, commercial, furniture, appliance, and/or other applications.

BACKGROUND AND SUMMARY OF EXAMPLE EMBODIMENTS OF THE INVENTION

Mirrors have been in existence for years and have been used in interior building applications such as, for example, in bathrooms, as decorations, for furniture, etc., and for exterior applications. Mirrors generally are either first surface mirrors where the mirror coating is provided between the viewer and the supporting glass substrate, or second surface mirrors, where the supporting glass substrate is interposed between the viewer and the mirror coating. See, for example; U.S. Pat. Nos. 7,276,289 and 7,678,459; U.S. Publication Nos. 2006/0077580; 2007/0178316; 2008/0073203; 2008/0164173; 2010/0229853; 2011/0176212; and 2011/0176236. The entire contents of each of these patent documents are hereby incorporated herein by reference.

FIG. 1 is a cross sectional view of a conventional second surface mirror. The mirror in FIG. 1 includes a mirror coating on glass substrate 100, the mirror coating being composed of silicon nitride layer 101, sputter-deposited aluminum reflective layer 102, silicon nitride layer 103, and optional PPF (permanent protective film) or paint layer 108. Despite the fact that aluminum is highly reactive, it possesses defense against corrosion and tarnishing, namely by way of forming a very thin stable aluminum oxide layer at a surface thereof which prevents/reduces the rest of the aluminum in the aluminum reflective layer from further oxidation. Aluminum is also cheaper than silver. However, the mirror of FIG. 1 suffers from the following problems. First, its visible reflectance is not as good as a high priced silver mirror. Aluminum mirrors are cheaper than silver mirrors, but provide for a lower amount of visible light reflectance, This problem affects the general quality of reflected images and often limits the use of such mirrors to clean-cut applications using thinner glass such as glass less than 4 mm thick. Thicker glass, used for example in beveled mirrors, absorbs a greater portion of light and often requires the use of reflective material which reflectance higher than that of aluminum. Second, its glass side reflective color tends to shift toward the blue color range (compared to a silver mirror), i.e., a blue color shift, which some consider to be aesthetically undesirable. In home/residential mirrors, especially under fluorescent light, the blue shift of the spectrum adds "cool cast" to the reflected image which some believe to be aesthetically undesirable. Given that fluorescent lights are becoming more popular in home/residential and certain commercial/office applications, there is a need in the art to add a "warm cast" to aluminum mirrors in order to make reflected images appear more natural.

Thus, it will be appreciated that there is a need in the art for improved mirrors and/or methods of making the same, where one or both of the problems identified above are addressed. Thus, certain embodiments of this invention relate to mirrors that solve one or both of the problems discussed above.

Certain example embodiments of this invention relate to mirrors including at least one of: (a) a first reflective layer of or including aluminum and a second reflective layer of or including silver or the like, and/or (b) a color tuning layer between first and second reflective layers. The mirrors may be second surface mirrors in certain example embodiments of this invention.

Certain example embodiments of this invention relate to providing a thin reflective layer of low refractive index material (e.g., silver or copper) that is sputter deposited on the glass substrate (directly or indirectly) so as to be located between the glass substrate and an aluminum inclusive reflective layer. This provides adds a "warm cast" to reflected images. In other words, compared to reflected images from the conventional mirror discussed above, this shifts the reflection spectrum to longer wavelengths as well in order to increase the intensity of reflected visible light. This allows the images from the mirror to appear more pleasant, and permits better image quality compared to the use of only an aluminum reflective layer as in the conventional mirror discussed above.

Certain example embodiments of this invention relate to mirrors including a color tuning layer, typically of a transparent dielectric material, provided between first and second reflective layers. The reflective layers may be of or include aluminum and/or silver. The color tuning layer embodiment may or may not be used in combination with the embodiment where both aluminum and silver reflective layers are provided.

In certain example embodiments of this invention, there is provided a mirror, comprising: a glass substrate; a reflective film on the glass substrate, the reflective film comprising or consisting essentially of a first metallic or substantially Metallic layer and a second metallic or substantially metallic layer; and wherein the first metallic or substantially metallic layer of the reflective film comprises silver (or copper), and the second metallic or substantially metallic layer of the reflective film comprises aluminum, and wherein the first metallic or substantially metallic layer comprising silver (or copper) is located between at least the glass substrate and the second metallic or substantially metallic layer comprising aluminum.

In certain example embodiments of this invention, there is provided a mirror comprising: a glass substrate; a reflective film on the glass substrate, the reflective film comprising a first metallic or substantially metallic layer and a second metallic or substantially metallic layer; and wherein the first metallic or substantially metallic layer of the reflective film comprises material selected from the group consisting of silver, copper and aluminum; wherein the second metallic or substantially metallic layer of the reflective film comprises aluminum, and wherein the first metallic or substantially metallic layer comprising silver is located between at least the glass substrate and the second metallic or substantially metallic layer comprising aluminum; and a dielectric film provided between and directly contacting the first and second layers of the reflective film.

DETAILED DESCRIPTION OF EXAMPLE EMBODIMENTS OF THE INVENTION

Figure 1:
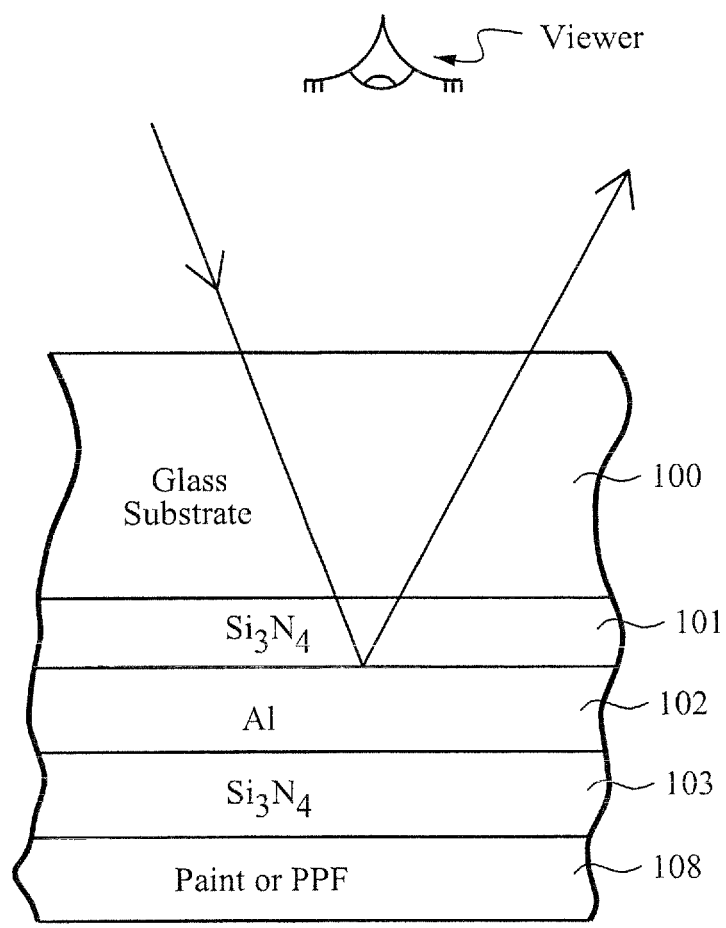
FIG. 1 is a cross sectional view of a conventional second surface mirror.

Referring now more particularly to the drawings in which reference numerals indicate like parts/materials throughout the several views. Mirrors according to example embodiments of this invention may be flat or bent in different instances, and may or may not be heat treated (e.g., thermally tempered and/or thermally bent).

Figure 2:
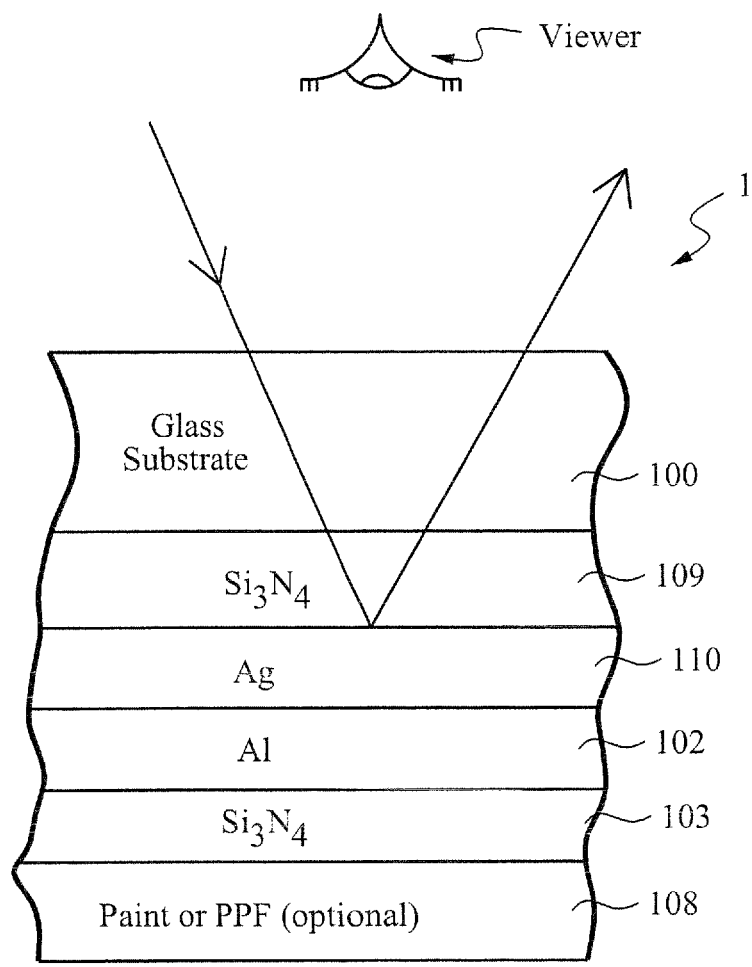
FIG. 2 is a cross sectional view of an example second surface mirror according to an example embodiment of this invention.
Figure 3:
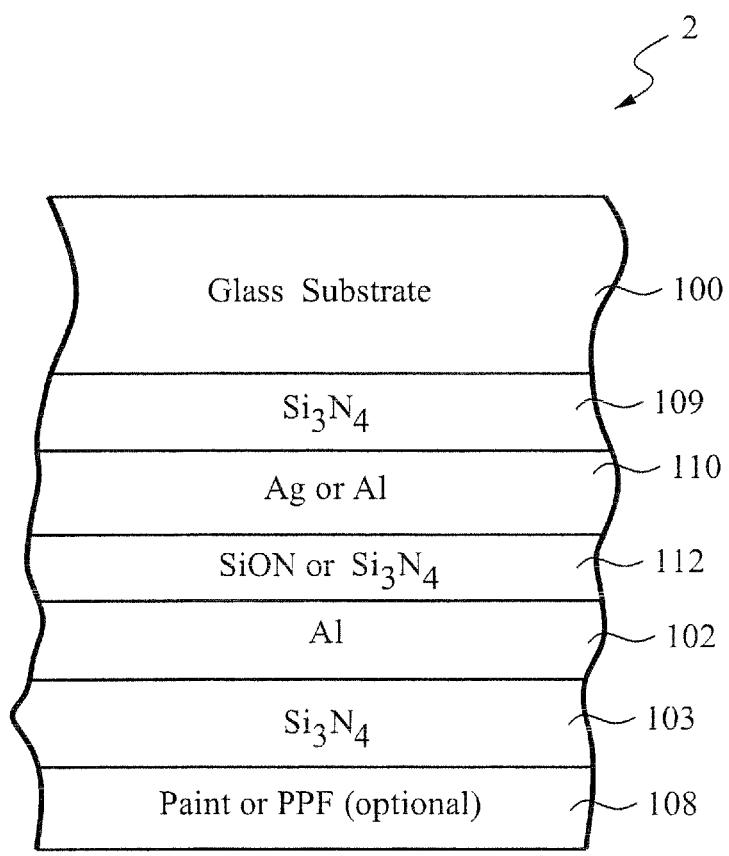
FIG. 3 is a cross sectional view of an example second surface mirror according to another example embodiment of this invention.

Referring to FIGS. 2-3, example embodiments of this invention relate to mirrors 1, 2 including at least one of: (a) a reflective film including a layer of or including aluminum 102 and a layer of or including silver 110 (e.g., see FIGS. 2-3), and/or (b) a color tuning layer 112 between layers 102, 110 of a reflective film wherein the layers 102, 110 may be of or include Ag, Al or the like (e.g., see FIG. 3). The reflective film is made up of layers 102 and 110. The mirrors may be second surface mirrors in certain example embodiments. The mirrors may be flat or bent in different instances, and may or may not be heat treated (e.g., thermally tempered and/or thermally bent). In certain example instances, such mirrors may be used in interior residential, commercial, furniture, bathroom, door, appliance, and/or other applications.

Certain example embodiments of this invention relate to providing a thin reflective layer 110 of low refractive index material (e.g., silver) that is sputter deposited on the glass substrate (directly or indirectly) 100 so as to be located between the glass substrate 100 and an aluminum inclusive reflective layer 102, as show in FIGS. 2-3. This provides adds a "warm east" to reflected images. In other words, compared to reflected images from the conventional mirror in FIG. 1, this shifts the reflection spectrum to longer wavelengths (e.g., toward yellow) as well in order to increase the intensity of reflected visible light. This allows the images from the mirror 1, 2 to appear more pleasant, and permits better image quality compared to the use of only an Al reflective layer as in the conventional mirror of FIG. 1. This effect is achieved due to at least the use of an optical interference effect and is similar to the "warm" and pleasant appearance of images reflected by silver mirrors, but at a lower cost than conventional silver mirrors. This also allows aluminum reflective layers 102 to be used in mirrors with thicker glass if desired.

Certain example embodiments of this invention relate to mirrors including a color tuning layer 112, typically of a transparent dielectric material, provided between layers 102, 110 of the reflective film (e.g., see FIG. 3). Each layer 102 and 110 of the reflective film may be of or include aluminum and/or silver. The color tuning layer embodiment (e.g., see FIG. 3) may or may not be used in combination with the embodiment where both aluminum and silver reflective layers are provided. Thus, while reflective layer 102 is of or includes aluminum and the other layer 110 of the reflective film may be of or include silver as shown in FIG. 3, the color tuning layer 112 may also be used in embodiments where both reflective layers 102 and 110 are of or include aluminum as indicated in FIG. 3.

FIG. 2 is a cross-sectional view of a second surface mirror 1 in accordance with certain example embodiments of this invention. As shown in FIG. 2, a glass substrate 100 supports a mirror coating including transparent seed layer 109 which may be a dielectric or semiconductor, metallic or substantially metallic conductive reflective layer 110 of or including silver, and metallic or substantially metallic conductive reflective layer 102 of or including aluminum. Transparent seed layer 109 may be of or include dielectric silicon nitride (e.g., $Si_3N_4$), which may optionally be doped with oxygen and/or from about 1-10% aluminum. Alternatively, transparent seed layer 109 may be of or include any of the following other dielectric materials: silicon oxynitride, silicon oxide (e.g., $SiO_2$), silicon aluminum oxide, zinc oxide, tin oxide, zinc aluminum oxide, zinc gallium oxide, aluminum oxynitride, or zinc stannate. The mirror coating may also optionally include dielectric layer 103 (e.g., of or including one or more of silicon nitride which may be doped with 1-10% aluminum, silicon oxide which may be doped with 1-10% aluminum, silicon oxynitride which may be doped with 1-10% aluminum, aluminum oxynitride, or aluminum oxide) and/or PPF (e.g., tape) or paint layer 108, in order to protect the reflective layers and provide for a more durable mirror.

Glass substrate 100 may be soda-lime-silica based glass, and may be from about 1-10 mm thick, more preferably from about 2-6 mm thick, in example embodiments of this invention.

Thus, the transparent seed layer 109 is first sputter-deposited or otherwise provided on glass substrate 100, using ceramic or metal sputtering target(s). For example, in embodiments where the transparent dielectric seed layer 109 is of silicon nitride, the silicon nitride seed layer may be sputter deposited on the glass substrate using one or more silicon targets (which may be doped with Al). Then, the reflective silver layer 110 is then sputter deposited on the glass substrate 100 over the seed layer 109, e.g., via one or more silver sputtering targets, possibly in the same sputter coating apparatus without breaking vacuum. The provision of the thin silver based layer 110 does not significantly compromise the line speed of the sputtering process, and preferably adds only a small cost premium (compared to aluminum) due to higher silver material cost, because the silver based layer 110 is preferably thinner than the aluminum based layer 102.

The role of the transparent dielectric seed layer 109 (e.g., of or including one or more of silicon nitride, silicon oxynitride, silicon oxide, silicon aluminum oxide, zinc oxide, tin oxide, zinc aluminum oxide, zinc gallium oxide, aluminum oxynitride, or zinc stannate) is twofold. First, the layer 109 acts as a "seed" layer to improve the adhesion of the reflective layer(s) to the glass substrate. Second, the layer 109 minimizes or reduces the potential for sodium migration from the glass substrate 100 into the reflective layer(s), such as during optional heat treatment such as thermal tempering or heat bending. It has also surprisingly been found that if the seed layer 109 (i) is not of material having a low refractive index (n) and/or (ii) does not have a low thickness, then the seed layer can undesirably reduce the reflectance of the mirror of FIG. 1. Thus, in certain example embodiments of this invention, the seed layer 109 has an index of refraction (n, measured at 550 nm) of from about 1.45 to 2.05, more preferably from about 1.45 to 2.0, even more preferably from about 1.5 to 1.85, and most preferably from about 1.5 to 1.75. For low refractive index values (e.g., around 1.45 to 1.65) of seed layer 109, thickness of the layer 109 is not overly important because even as the thickness of the seed layer 109 increases it does not significantly adversely affect the visible reflectance of the mirror when the layer 109 has a low refractive index value. However, at higher refractive index values (e.g., from about 1.9 to 2.05), it is desirable to minimize or reduce the thickness of the seed layer 109 so that the layer does not significantly adversely affect (i.e., so that it does not significantly reduce) the visible reflectance of the mirror. Thus, in certain example embodiments of this invention, especially when the layer 109 has higher refractive index value(s) such as silicon nitride which has a refractive index of about two, the transparent dielectric seed layer 109 is from about 20-500 Å thick, more preferably from about 25-300 Å thick, more preferably from about 25-100 Å thick, and most preferably from about 30-60 Å thick. Of course, the drop in reflectance caused by thick seed layers 109 of higher index materials such as silicon nitride can be made up for, in part or in full, by the provision of the higher reflectance silver material in layer 110. Thus, these thickness values for the seed layer 109 are optional, may be used in preferred embodiments, but are not necessary in all embodiments.

Layers 102 and 110 together make up a reflective film for the mirror, and therefore both layers 102 and 110 are referred to as reflective layers even though a thin silver layer 110 alone may not be truly reflective if not combined with the aluminum layer in the same coating. In example embodiments, reflective layer 110 of or including silver is from about 40-500 Å thick, more preferably from about 40-250 Å thick, more preferably from about 70-250 Å thick, more preferably from about 80-240 Å thick, still more preferably from about 90-200 Å thick, and most preferably from about 100-140 Å thick, with an example thickness of a silver layer 110 being about 100 Å. In example embodiments, reflective layer 102 of or including aluminum is from about 150-2,000 Å thick, more preferably from about 180-1,000 Å thick, even more preferably from about 180-700 Å thick, still more preferably from about 180-400 Å thick, more preferably from about 200-375 Å, and most preferably from about 250-375 Å thick, with an example thickness of an aluminum layer 102 being about 300 Å. For the reasons explained above, in certain preferred embodiments, the silver based layer 110 is thinner than the aluminum based layer 102. For example, in certain example embodiments, silver based layer 110 is at least about 50 Å thinner (more preferably at least about 100 Å thinner) than aluminum based layer 102.

Figure 4:
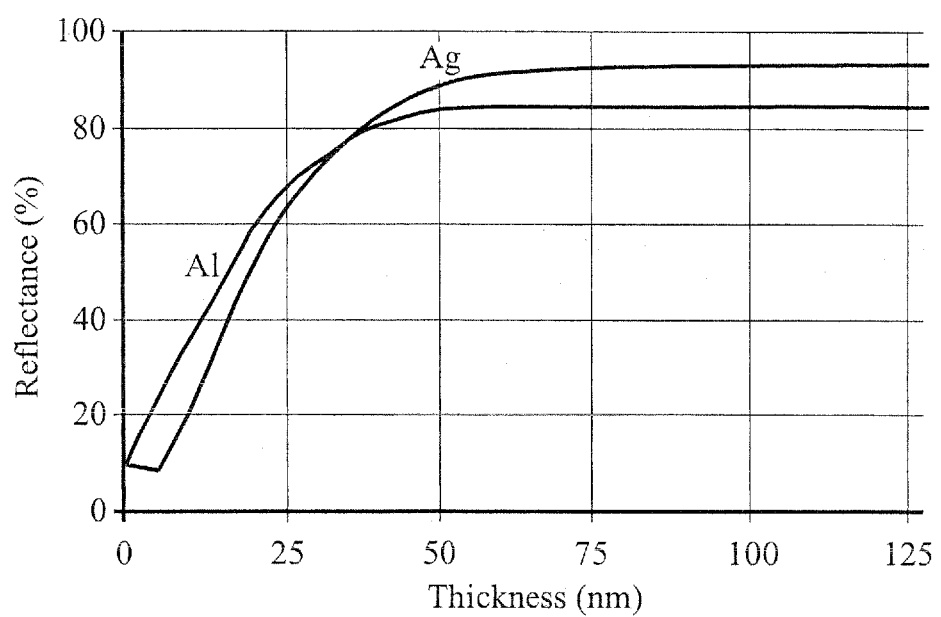
FIG. 4 is a visible reflectance (%) versus thickness graph, illustrating the visible reflectance of Al and Ag layers at various thicknesses.

FIG. 4 is a visible reflectance (%) versus thickness graph, illustrating the visible reflectance of Al and Ag layers at various thicknesses. FIG. 4 demonstrates the dependence of reflectance on layer thickness of sputter Al (aluminum), and the reflectance of sputtered Ag (silver) is also shown for purposes of comparison. Al thickness of about 40-50 nm (400-500 Å), for example, allows for achieving approximately maximum intensity of reflected light using a minimum amount of material, and thus allows for a highest line speed of the sputtering process in making mirrors.

Figure 5:
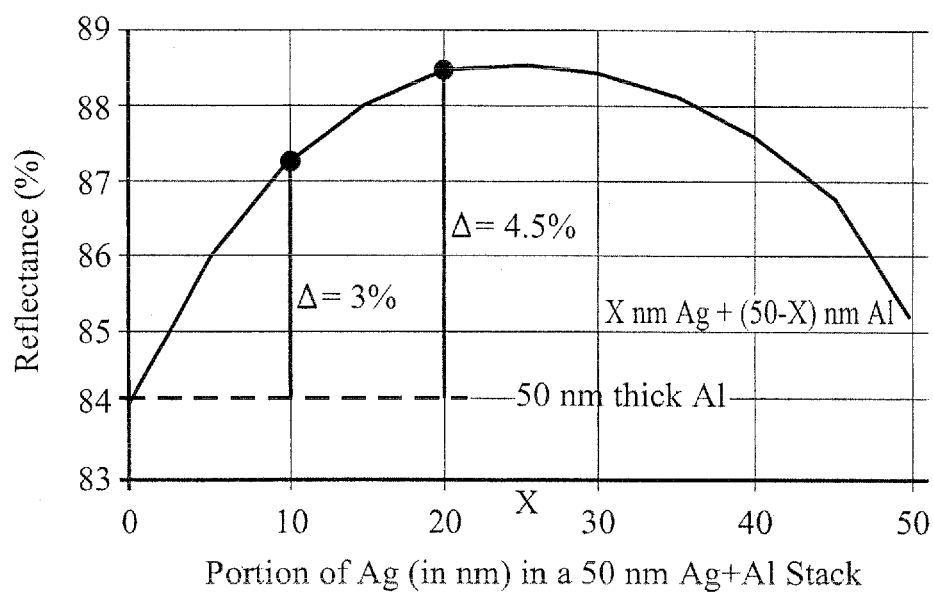
FIG. 5 is visible reflectance (%) versus x graph, where x is the thickness of the silver layer making up the combination of a 50 nm thick film of both the silver layer and the aluminum layer in the FIG. 2 embodiment.

FIG. 5 is visible reflectance (%) versus x graph, where x is the thickness of the silver layer making up the combination of a 50 nm thick film of both the silver layer and the aluminum layer in the FIG. 2 embodiment, where the graph illustrates the effect of thickness of the silver layer on total visible reflectance of the Ag/Al stack with total thickness of 40-50 nm. As shown in FIG. 5, substitution of the front 10 nm of Al with silver in a 50 nm thick Al/Ag film (film made up of layers 102 and 110 in FIG. 2), for a 40 nm thick Al layer 102 and a 10 nm thick Ag layer 110, results in a 3% increase in visible reflectance compared to if the 50 nm film was made up of solely Al. FIG. 5 illustrates that if the 50 nm film was made up of solely Al then the reflectance is about 84% (see the horizontal dotted line in FIG. 5). Thus, the advantage of using Ag for part of the film is appreciated, as it allows for improved reflectance. This increase caused by the 10 nm of Ag in FIGS. 2 and 5 is enough, for example, to compensate for loss of reflectance intensity caused by increasing glass 100 thickness by about 3 mm. FIG. 5 also shows that substitution of 20 nm of Al with Ag (resulting in a 20 nm thick Ag layer 110 and a 30 nm thick Al layer 102 in FIG. 2) results in a maximum reflectance increase of 4.5% compared to if the 50 nm film was made up of solely Al. Further increase of the Ag layer, however, may result in decreased reflectance due to an optical interference effect. Thus, the advantage of providing Ag layer 110 in combination with Al layer 102 can be seen due to the increased reflectance that can be achieved. And when the overall film made up of layers 102 and 110 is about 50 nm thick it can be seen that the optimum Ag layer 110 thickness is from about 8-24 nm (80-240 Å). It will be appreciated that the reflective film (layer 102+layer 110) may be from about 30-200 nm thick, more preferably from about 40-100 nm thick, and most preferably from about 40-60 nm thick in example embodiments of this invention, and that the Al layer 102 is generally thicker than the Ag (or Cu) layer 110.

In addition to the increase in reflectance with the Ag based layer 110 is used in combination with the Al based layer 102, it has been found that this also provides for a long wavelength (yellow) shift of the reflectance spectrum which adds a warm and aesthetically pleasant cast to images reflected by the mirror, particularly under cool illumination such as fluorescent lighting. This represents yet another advantage associated with example embodiments of this invention.

FIG. 2 illustrates that the additional layer 110 is of or includes Ag in certain preferred embodiments of this invention: However, it is also possible for layer 110 to be of a different low index material such as copper (Cu).

Optionally, dielectric protective layer 103 (e.g., silicon nitride of $Si_3N_4$ or other suitable stoichiometry) may also be sputter-deposited on the substrate 100, over the reflective film 102, 110. Protective layer 103 may be of or include materials such as silicon nitride, silicon oxynitride, silicon oxide, aluminum oxynitride, and/or aluminum oxide in example embodiments, Sputter-deposited protective dielectric layer 103, if provided, may be from about 50-1,000 Å thick, more preferably from about 100-400 Å thick, in certain example embodiments.

Instead of, or in addition to, layer 103, a protective film 108 of paint or PPF may be provided on the substrate 100 over the reflective film 102, 110. Permanent protective film (PPF) 108 may have high adhesion levels, good chemical resistance, and/or excellent environmental durability. The protective film 108 may be resistant to delamination from moisture penetration and/or the use of asphalitic based adhesives applied to the exterior surface of the protective film. In certain example embodiments, the PPF 108 may be thin, e.g., having a thickness of <200 microns, and sometimes about 40-100 microns in thickness. Peel strength may be increased through the incorporation of additional cross-linking polymers in certain example embodiments. Example protective films 108 from Nitto-Denko include: SPV-9310, SPV-9320, SPV-30800, SPV 5057 A5, and SPV 5057 A7, Other manufacturers of similar preferred protective films include Permacel, Tessa Tapes, B&K Films, and Novacell. These plastic films come in a wide variety of opacities and colors.

In FIG. 2, the seed layer 109 is in direct contact with the glass substrate 100, However, it is possible that other layer(s) may be provided therebetween in various embodiments.

FIG. 3 is a cross sectional view of an example second surface mirror according to another example embodiment of this invention. It will be appreciated that the mirror coating in FIG. 3 may be the same as shown and described with respect to FIG. 2, except that: (a) color tuning layer 112 is present in the FIG. 3 embodiment between layers 102 and 110, and (b) the layer 110 may be of or include aluminum in the FIG. 3 embodiment (instead of Ag or Cu). Color tuning layer 112 may be from about 30-300 Å thick, more preferably from about 40-100 Å thick, in example embodiments of this invention. The color tuning layer 112 may be of or include a material such as silicon nitride and/or silicon oxynitride (possibly doped with 1-10% Al) in example embodiments of this invention, although other material(s) may instead be used. The reflective film (layer 102+layer 110) in the FIG. 3 embodiments provides for two reflected waves, one reflected by layer 102 and the other reflected by layer 110. The mirror structure of FIG. 3 allows for increased visible reflectance compared to the conventional mirror of FIG. 1, and does not necessarily need Ag or Cu in layer 110. The mirror 2 in FIG. 3, like the mirror in FIG. 2, is a second surface mirror because the incident light first passes through glass substrate 100 before it is reflected by reflective film made up of layers 102 and 110.

Mirrors shown in FIGS. 2-3 may have a visible transmission of from about 1-15%, more preferably from about 1-12%, more preferably from about 1-8%. And the mirrors shown in FIGS. 2-3 may have a visible glass side reflectance of from about 85-95%, more preferably from about 85-90%, even more preferably from about 85-89%, and most preferably from about 86-89%, in example embodiments of this invention (e.g., see FIG. 5).

While a layer, layer system, coating, or the like, may be said to be "on" or "supported by" a substrate, layer, layer system, coating, or the like, other layer(s) may be provided therebetween. Thus, for example, the coatings or layers described above may be considered "on" and "supported by" the substrate and/or other coatings or layers even if other layer(s) are provided therebetween.

In example embodiments of this invention, there is provided a mirror, comprising: a glass substrate; a reflective film on the glass substrate, the reflective film comprising a first metallic or substantially metallic layer and a second metallic or substantially metallic layer; and wherein the first metallic or substantially metallic layer of the reflective film comprises silver or copper, and the second metallic or substantially metallic layer of the reflective film comprises aluminum, and wherein the first metallic or substantially metallic layer comprising silver or copper is located between at least the glass substrate and the second metallic or substantially metallic layer comprising aluminum.

In the mirror of the immediately preceding paragraph, the first metallic or substantially metallic layer of the reflective film may consist essentially of either silver or copper.

In the mirror of any of the preceding two paragraphs, the second metallic or substantially metallic layer of the reflective film may consist essentially of aluminum.

The mirror of any of the preceding three paragraphs may further comprise at least one seed layer located between the glass substrate and the first metallic or substantially metallic layer comprising silver or copper, and wherein the seed layer directly contacts the first metallic or substantially metallic layer. The seed layer may comprise one or more of silicon nitride, silicon oxynitride, silicon oxide, zinc oxide, tin oxide, aluminum oxynitride, and zinc stannate.

In the mirror of any of the preceding four paragraphs, the first metallic or substantially metallic layer comprising silver or copper may be from 80-240 Å thick, more preferably from 90-200 Å thick.

In the mirror of any of the preceding five paragraphs, the second metallic or substantially metallic layer comprising aluminum may be from 180-700 Å thick, more preferably from 180-400 Å thick.

In the mirror of any of the preceding six paragraphs, the reflective film may be from 40-100 nm thick.

In the mirror of any of the preceding seven paragraphs, the mirror may have a glass side visible reflectance of from about 85-95%.

In the mirror of any of the preceding eight paragraphs, the first and second layers of the reflective film may be sputter-deposited layers.

The mirror of any of the preceding nine paragraphs may further comprise a layer comprising paint, with the reflective film being located between at least the glass substrate and the layer comprising paint.

The mirror of any of the preceding ten paragraphs may further comprise a protective layer, the reflective film being located between at least the glass substrate and the protective layer. The protective layer may comprise silicon nitride for example.

The mirror of any of the preceding eleven paragraphs may be a second surface mirror.

The mirror of any of the preceding twelve paragraphs may further comprise a dielectric layer provided between the first metallic or substantially metallic layer comprising silver or copper and the second metallic or substantially metallic layer comprising aluminum. Optionally, the dielectric layer may directly contact one or both of the first and second layers of the reflective film. The dielectric layer may comprise silicon nitride and/or silicon oxynitride for example. Alternatively, in the mirror of any of the preceding twelve paragraphs, the first metallic or substantially metallic layer comprising silver or copper may directly contact the second metallic or substantially metallic layer comprising aluminum.

In the mirror of any of the preceding thirteen paragraphs, the first metallic or substantially metallic layer comprising silver or copper may be at least 50 Å thinner than the second metallic or substantially metallic layer comprising aluminum.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mirror, comprising:
   a glass substrate;
   a reflective film on the glass substrate, the reflective film comprising a first metallic or substantially metallic layer and a second metallic or substantially metallic layer; and wherein the first metallic or substantially metallic layer of the reflective film comprises silver and the second metallic or substantially metallic layer of the reflective film comprises aluminum, and wherein the first metallic or substantially metallic layer comprising silver is located between at least the glass substrate and the second metallic or substantially metallic layer comprising aluminum.

2. The mirror of claim 1, wherein the first metallic or substantially metallic layer of the reflective film consists essentially of silver.

3. The mirror of claim 1, wherein the second metallic or substantially metallic layer of the reflective film consists essentially of aluminum.

4. The mirror of claim 1, further comprising at least one seed layer located between the glass substrate and the first metallic or substantially metallic layer comprising silver, and wherein the seed layer directly contacts the first metallic or substantially metallic layer comprising silver.

5. The mirror of claim 4, wherein the seed layer comprises one or more of silicon nitride, silicon oxynitride, silicon oxide, zinc oxide, tin oxide, aluminum oxynitride, and zinc stannate.

6. The mirror of claim 4, wherein the seed layer comprises silicon nitride.

7. The mirror of claim 1, where the first metallic or substantially metallic layer comprising silver is from 80-240 Å thick.

8. The mirror of claim 1, where the first metallic or substantially metallic layer comprising silver is from 90-200 Å thick.

9. The mirror of claim 1, wherein the second metallic or substantially metallic layer comprising aluminum is from 180-700 Å thick.

10. The mirror of claim 1, wherein the second metallic or substantially metallic layer comprising aluminum is from 180-400 Å thick.

11. The mirror of claim 1, wherein the reflective film is from 40-100 nm thick.

12. The mirror of claim 1, wherein the mirror has a glass side visible reflectance of from about 85-95%.

13. The mirror of claim 1, wherein the first and second layers of the reflective film are sputter-deposited layers.

14. The mirror of claim 1, further comprising a layer comprising paint, the reflective film being located between at least the glass substrate and the layer comprising paint.

15. The mirror of claim 1, further comprising a protective layer, the reflective film being located between at least the glass substrate and the protective layer.

16. The mirror of claim 15, wherein the protective layer comprises silicon nitride.

17. The mirror of claim 1, wherein the mirror is a second surface mirror.

18. The mirror of claim 1, further comprising a dielectric layer provided between the first metallic or substantially metallic layer comprising silver and the second metallic or substantially metallic layer comprising aluminum.

19. The mirror of claim 18, wherein the dielectric layer comprises silicon nitride and/or silicon oxynitride.

20. The mirror of claim 1, wherein the first metallic or substantially metallic layer comprising silver directly contacts the second metallic or substantially metallic layer comprising aluminum.

21. The mirror of claim 1, wherein the first metallic or substantially metallic layer comprising silver is at least 50 Å thinner than the second metallic or substantially metallic layer comprising aluminum.

22. A mirror, comprising:
a glass substrate;
a reflective film on the glass substrate, the reflective film of the mirror comprising a reflective first metallic or substantially metallic layer and a reflective second metallic or substantially metallic layer;
wherein the first metallic or substantially metallic layer of the reflective film comprises copper and the second metallic or substantially metallic layer of the reflective film comprises aluminum, and wherein the first metallic or substantially metallic layer comprising copper is located between at least the glass substrate and the second metallic or substantially metallic layer comprising aluminum; and
wherein the mirror has a glass side visible reflectance of from about 85-95%.

23. The mirror of claim 22, wherein the first metallic or substantially metallic layer of the reflective film consists essentially of copper.

24. The mirror of claim 22, wherein the second metallic or substantially metallic layer of the reflective film consists essentially of aluminum.

25. A mirror, comprising:
a glass substrate;
a reflective film on the glass substrate, the reflective film of the mirror comprising a reflective first metallic or substantially metallic layer and a reflective second metallic or substantially metallic layer;
wherein the first metallic or substantially metallic layer of the reflective film comprises material selected from the group consisting of silver, copper and aluminum;
wherein the second metallic or substantially metallic layer of the reflective film comprises aluminum, and wherein the first metallic or substantially metallic layer comprising silver is located between at least the glass substrate and the second metallic or substantially metallic layer comprising aluminum;
a dielectric layer provided between and directly contacting the first and second layers of the reflective film; and
wherein the mirror has a glass side visible reflectance of from about 85-95%.

26. The mirror of claim 25, wherein the dielectric layer comprises silicon nitride.

27. The mirror of claim 25, wherein the dielectric layer comprises silicon oxynitride.

* * * * *